United States Patent
Teramoto

(10) Patent No.: US 7,773,186 B2
(45) Date of Patent: Aug. 10, 2010

(54) DISPLAY PANEL COMPRISING WIRES HAVING SHAPED MARKS AND DISPLAY DEVICE HAVING THE SAME

(75) Inventor: Kenji Teramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 254 days.

(21) Appl. No.: 11/424,386

(22) Filed: Jun. 15, 2006

(65) Prior Publication Data

US 2006/0285054 A1 Dec. 21, 2006

(30) Foreign Application Priority Data

Jun. 20, 2005 (JP) ............... 2005-178811

(51) Int. Cl.
- *G02F 1/1333* (2006.01)
- *G02F 1/1343* (2006.01)
- *G02F 1/1345* (2006.01)
- *G02F 1/13* (2006.01)

(52) U.S. Cl. .................... 349/149; 349/54; 349/55; 349/152; 349/192

(58) Field of Classification Search ............. 349/40, 349/54–55, 149–152, 192
See application file for complete search history.

(56) References Cited

U.S. PATENT DOCUMENTS

| | | | | |
|---|---|---|---|---|
| 5,914,763 A | * | 6/1999 | Fujii et al. ............... | 349/149 |
| 6,522,378 B1 | * | 2/2003 | Mizuno et al. ............ | 349/139 |
| 6,525,718 B1 | * | 2/2003 | Murakami et al. ......... | 345/206 |
| 6,665,039 B1 | * | 12/2003 | Glownia et al. ........... | 349/153 |
| 6,683,669 B1 | * | 1/2004 | Fujikawa ................. | 349/149 |
| 6,734,925 B1 | * | 5/2004 | Lee et al. ................. | 349/40 |
| 6,853,428 B2 | * | 2/2005 | Han et al. ................. | 349/139 |
| 7,110,057 B2 | * | 9/2006 | Jeon ....................... | 349/40 |
| 7,372,514 B2 | * | 5/2008 | Matsumoto et al. ........ | 349/55 |
| 2003/0063250 A1 | * | 4/2003 | Sumi et al. ............... | 349/158 |

FOREIGN PATENT DOCUMENTS

JP 2001-166324 6/2001

* cited by examiner

*Primary Examiner*—Andrew Schechter
*Assistant Examiner*—Charles Chang
(74) *Attorney, Agent, or Firm*—Oblon, Spivak, McClelland, Maier & Neustadt, L.L.P.

(57) ABSTRACT

In the manufacture of a display device, an object of the invention is to make it possible to easily and precisely measure the amount of beveling of the display panel without an increase in manufacturing costs. In the process of manufacturing a display device, a shorting interconnection (10) is provided near edges of the display panel in order to short-circuit signal interconnections and scanning interconnections (interconnections 3). In a final stage, the shorting interconnection (10) is removed together with a beveled area (A2) by the beveling of the edges of the display panel. The interconnections (3) have marks (11) that are formed near the edges of the substrate and used as reference for the amount of beveling. Each mark (11) is located in a position shifted from the mark (11) of an adjacent interconnection (3) along the length of the interconnections (3).

12 Claims, 3 Drawing Sheets

DISPLAY PANEL COMPRISING WIRES HAVING SHAPED MARKS AND DISPLAY DEVICE HAVING THE SAME

BACKGROUND OF THE INVENTION

1. Field of the Invention

The present invention relates to a display device having a display panel formed of a pair of substrates and a display material, such as liquid crystal, sandwiched therebetween.

2. Description of the Background Art

In a display panel (liquid-crystal panel) of a liquid-crystal display device, a liquid-crystal material is sandwiched between a pair of substrates, and a plurality of signal interconnections and scanning interconnections, perpendicular to each other, are provided on the panel. In the display panel, pixels are formed at the intersections of the signal interconnections and the scanning interconnections.

For example, in an active-matrix display panel in which each pixel has a switching element (also called "an active component") such as a thin film transistor (TFT), the signal interconnections, scanning interconnections, and switching elements are formed on one of the two substrates. Pixel electrodes are provided opposite the respective switching elements in the pixels. The signal interconnections and scanning interconnections are controlled by an external driver device, whereby the individual switching elements are driven to turn on/off desired pixels to display images.

The manufacture of such a display device includes a cell fabrication process in which two substrates are assembled together and liquid crystal is injected therebetween, and the cell fabrication process includes rubbing processing in which polyimide films (alignment layers) applied on the substrates are rubbed with cloth in order to align the liquid-crystal material. This process causes so large amounts of static electricity that overvoltage may be applied to the scanning interconnections and signal interconnections, which may lead to breakage of switching elements and hence occurrence of line defects.

In a common method for preventing formation of such line defects, a shorting interconnection is provided to short-circuit all signal interconnections and scanning interconnections to provide increased electric capacitance, thereby dispersing and reducing the damage to the switching elements. The shorting interconnection is removed immediately before a process like inspection of images on the display panel that requires removal of the shorting interconnection. Accordingly, the shorting interconnection is placed near edges of the substrate (near edges of the display panel) so that it can be removed easily. The shorting interconnection can thus be removed easily by the beveling of the edges.

However, in the beveling process, the shorting interconnection may be insufficiently removed because of variations of the amount of beveling. Then, fragments of the shorting interconnection remaining unremoved will cause short-circuits between adjacent interconnections, leading to display defects like line defects and breakage of driver circuitry used for inspection. Such insufficient removal of the shorting interconnection can be prevented by removing larger portions by the beveling, but this leads to other problems. For example, the beveling process will then take a longer time and require increased costs, or excessive beveling may erroneously remove connecting terminals connected to the signal interconnections and scanning interconnections.

There are strong demands for weight reduction and reduction of picture-frame size of liquid-crystal display devices because they are applied to notebook personal computers, portable terminals, and the like. In an approach for meeting the demands, the area for beveling is reduced by reducing the amount of beveling of display panel edges. However, this approach needs more enhanced beveling precision. Enhancing the beveling precision without extra costs requires establishing process control capable of more precisely controlling the amount of beveling in ordinary manufacturing process.

In a suggestion made to solve this problem, marks are provided near substrate edges to be beveled in order to show the extent of beveling (for example, see Japanese Patent Application Laid-Open No. 2001-166324, which is hereinafter referred to as Patent Document 1). According to Patent Document 1, marks indicating the extent of beveling are provided near edges of a display panel in positions corresponding to a necessary minimum area including the shorting interconnection to be beveled (lower limit position), positions corresponding to a maximum area that can be beveled (upper limit position), and intermediate positions therebetween (central position). Then, the beveling process is conducted while visually checking the marks, making it possible to easily prevent insufficient removal of the shorting interconnection and excessive beveling. Also, by checking the amount of beveling with the marks, it is possible to easily grasp how the amount of beveling varies, whereby the beveling precision can be enhanced.

In particular, Patent Document 1 suggests formation of the mark and interconnection as one piece (see FIGS. 6 to 8 of Patent Document 1).

In such a conventional display panel as described in Patent Document 1, the marks are provided only in positions corresponding to the upper limit and lower limit of beveling and the central position between them. Accordingly, it is possible to know whether the amount of beveling is within a specified range (i.e., whether the finish of beveling is between the upper limit and lower limit positions), but its variation within the specified range cannot be measured. Therefore, precisely controlling the amounts of beveling further requires measuring the amounts of beveling with a precision distance meter. This results in increased process control costs and leads to increased display device manufacturing costs.

SUMMARY OF THE INVENTION

In the manufacture of a display device, an object of the invention is to make it possible to easily and precisely measure the amount of beveling of the display panel without incurring an increase in manufacturing costs.

The present invention relates to a display panel having first and second substrates sandwiching a display material, and a group of interconnections including a plurality of mutually parallel interconnections formed on the first substrate. According to the invention, the group of interconnections includes a plurality of marked interconnections having predeterminedly shaped marks formed in the vicinity of an edge of the first substrate. The marks of adjacent marked interconnections are located in positions shifted from each other along the length of the interconnections.

According to the display panel, the amount of beveling of display panel edges can be visually measured without a need to use a tool like a precision distance meter. This allows precise control of the beveling process without increased costs. As a result, the precision of beveling is enhanced and the margin of beveling (i.e., the distance between the upper limit and lower limit positions) can be reduced. This contributes to weight reduction and picture-frame size reduction of the display panel while preventing manufacturing cost increase.

Also, the marks are formed as portions of the interconnections, and therefore there is no need for any additional special process to form the marks during the manufacture of the display device. That is, the formation of the marks merely requires changing the shape of the interconnections on the first substrate so that portions of them form the visually recognizable marks. This can be achieved without considerable increase in manufacturing costs.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
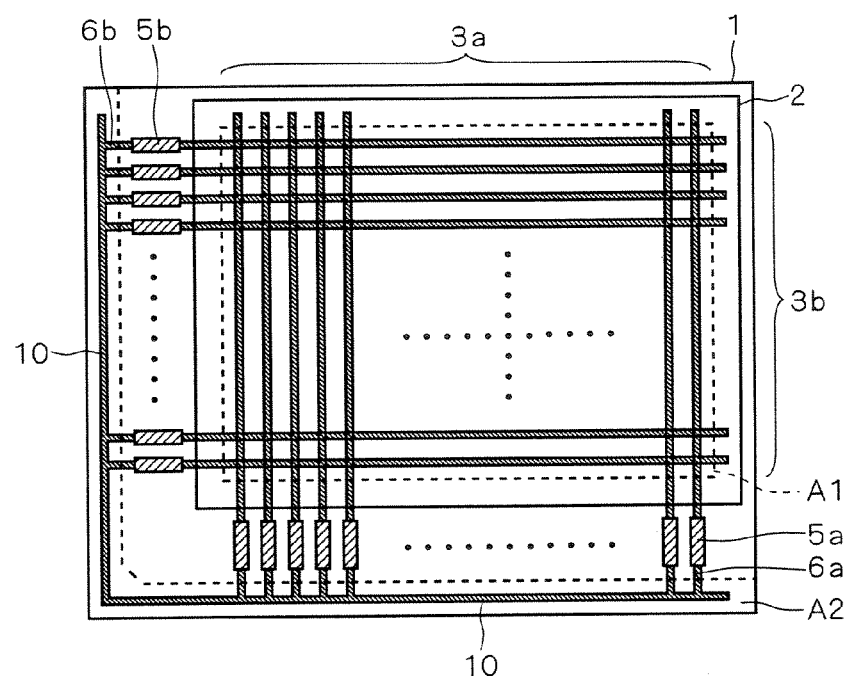
FIG. 1 is a plan view of the display panel of a display device according to a first preferred embodiment.

The structure of a display device according to a preferred embodiment will now be described. The description herein shows a TFT liquid-crystal display device as a display device to which the present invention is applied. FIG. 1 is a plan view of a display panel (liquid-crystal panel) of the display device of the invention. FIG. 1 shows the display panel from which a shorting interconnection has not yet been removed. The beveled area A2 including the shorting interconnection 10 shown in FIG. 1 is removed by beveling when the display panel is attached to the display device (for example, before an image inspection process).

This display panel includes a first substrate 1 and a second substrate 2 sandwiching liquid crystal as display material. On the first substrate 1, a plurality of parallel signal interconnections 3a and a plurality of parallel scanning interconnections 3b are formed. The signal interconnections 3a and the scanning interconnections 3b are arranged so that they intersect perpendicular to each other in the display area A1, and TFTs (not shown) as active components and pixel electrodes (not shown) are provided at their intersections to form pixels. The TFTs are driven to control liquid crystal alignment so as to display images on the display panel.

As shown in FIG. 1, the first substrate 1 is sized larger than the second substrate 2, and the signal interconnections 3a and the scanning interconnections 3b extend out of the second substrate 2. The signal interconnections 3a have extended portions (extended interconnections 6a) and signal interconnection connecting terminals 5a are electrically connected to the extended interconnections 6a, and the scanning interconnections 3b have extended portions (extended interconnections 6b) and scanning interconnection connecting terminals 5b are electrically connected to the extended interconnections 6b. The signal interconnection connecting terminals 5a and the scanning interconnection connecting terminals 5b are provided for connection of external driver circuitry to the display panel.

The ends of the signal interconnections 3a and the scanning interconnections 3b are electrically connected to the shorting interconnection 10. As mentioned earlier, the shorting interconnection 10 short-circuits the signal interconnections 3a and the scanning interconnections 3b to protect the TFTs of the pixels from static electricity. The shorting interconnection 10 is formed within the beveled area A2 along the edges of the first substrate 1 so that it can be easily removed by the beveling of those edges before, e.g., an image inspection process.

In the description below, for the sake of convenience, the signal interconnections 3a and the scanning interconnections 3b are referred to together as "interconnections 3", and the wording "interconnections 3" includes both of the signal interconnections 3a and the scanning interconnections 3b. Similarly, the signal interconnection connecting terminals 5a and the scanning interconnection connecting terminals 5b are referred to together as "connecting terminals 5", and the extended interconnections 6a of the signal interconnection connecting terminals 5a and the extended interconnections 6b of the scanning interconnection connecting terminals 5b are referred to together as "extended interconnections 6".

Figure 2:
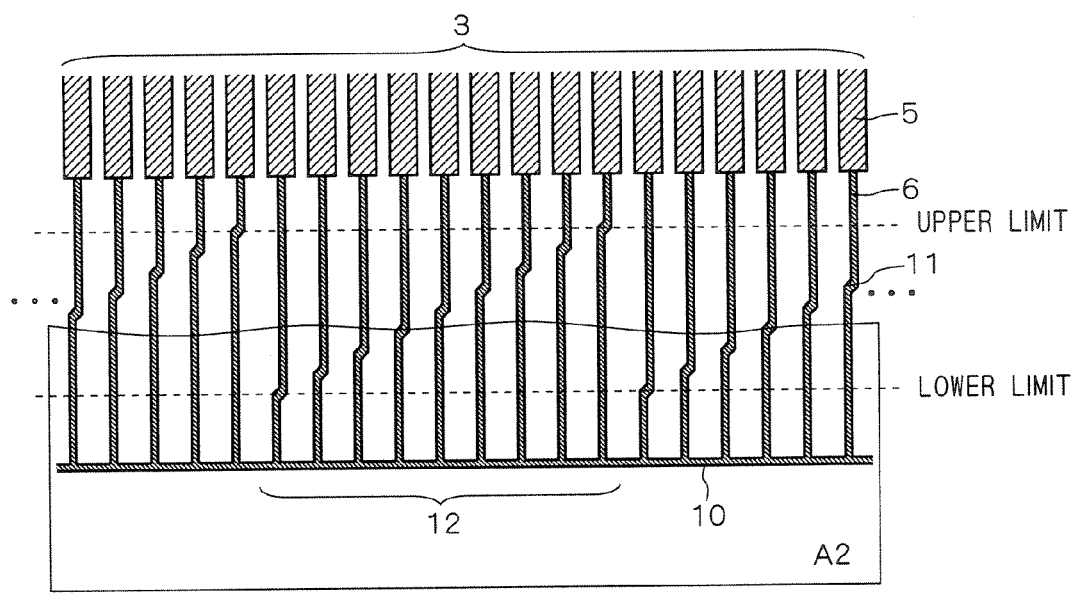
FIG. 2 is an enlarged view of a beveled area and its vicinity near an edge of the display panel of the first preferred embodiment.

FIG. 2 is an enlarged view of the beveled area A2 and its vicinity along an edge of the display panel of FIG. 1. As shown in FIG. 2, marks 11 are formed as parts of the interconnections 3 (extended interconnections 6) that extend into the beveled area A2, so that the amount of beveling can be visually measured during the process of removing the beveled area A2 (beveling process). In the example of FIG. 2, the interconnections 3 are bent and the bent portions are used as the marks 11. The marks 11 are formed between the connecting terminals 5 of the interconnections 3 and the shorting interconnection 10, i.e., near the edge of the first substrate 1 and inside the shorting interconnection 10. More specifically, as shown in FIG. 2, the marks 11 are formed in the region between an upper limit position and a low limit position of beveling that are separated by a margin of a given width on both sides of a central position corresponding to the target position of the beveling.

As mentioned earlier, when the beveling is finished on the inside of the upper limit position of the first substrate 1, problems like removal of connecting terminals 5 are likely to happen. On the other hand, when the beveling is finished on the outside of the lower limit position of the first substrate 1, the shorting interconnection 10 may be insufficiently removed to cause short-circuits of interconnections 3. The beveling is therefore performed such that the finish position is between the upper limit and lower limit positions (within a specified range). With conventional display panels, it is possible to check whether the amount of beveling is within the specified range, but it is not possible to visually check how much the amount of beveling varies within the specified range because the marks used as reference of beveling are provided only in the three positions corresponding to the upper limit, the lower limit, and the central position.

According to the present invention, the marks 11 are formed as parts of the interconnections 3, and the positions of the marks 11 of adjacent interconnections 3 are shifted from each other at a given distance along the length of the interconnections 3. In this preferred embodiment, as shown in FIG. 2, the marks 11 of the interconnections 3 are shifted one by one at a given distance from each other. Also, the marks 11 are arranged as a periodic pattern repeated in the direction in which the interconnections 3 form a row. The pattern corresponding to one cycle is hereinafter referred to as "a unit cycle pattern 12". In this preferred embodiment, one unit cycle pattern 12 includes nine interconnections 3.

That is, in this preferred embodiment, the marks 11 in a unit cycle pattern 12 are provided in nine positions between the upper limit and lower limit positions, with each mark 11 shifted at a given distance along the length of the interconnections 3 from the marks 11 of adjacent other interconnections 3. Thus, nine marks 11 are positioned at equal intervals between the upper limit and lower limit positions.

According to the preferred embodiment, the beveling process is conducted while referring to the marks 11 so that the beveling can be easily finished within the region between the upper limit and lower limit positions (within the specified range). At the same time, it is possible to visually measure the amount of beveling within the specified range and the variation thereof by counting how many of the marks 11 in a unit cycle pattern 12 have been removed, or how many of the marks 11 are remaining unremoved.

That is, the amount of beveling can be visually measured without a need to use a tool like a precision distance meter, which allows precise control of the beveling process without increased costs. As a result, the precision of beveling is enhanced and the margin of beveling (i.e., the distance between the upper limit and lower limit positions) can be reduced. This contributes to weight reduction and picture-frame size reduction while preventing manufacturing cost increase.

The preferred embodiment is advantageous also in that the amount of beveling can be visually measured in the same way in any parts of the beveled area A2 because the marks 11 are laid out as a repetition of the unit cycle patterns 12.

Also, according to the preferred embodiment, the marks 11 are formed as portions of the interconnections 3, and therefore there is no need for any additional special process to form the marks 11 during the manufacture of the display device. That is, the formation of the marks 11 merely requires changing the shape of the interconnections 3 on the first substrate 1 so that portions of them form the visually recognizable marks 11. This can be achieved without considerable increase in manufacturing costs.

The process steps following the formation of the interconnections 3, TFTs, and the like on the first substrate 1 are conducted in the conventional way. That is, the first substrate 1 and the second substrate 2 are placed on each other and liquid crystal material is injected between them so as to fabricate a display panel, and the first substrate 1 is beveled referring to the marks 11 to remove the shorting interconnection 10, which is followed by attaching of the display panel to the display device.

As shown in FIG. 2, this preferred embodiment has shown an example in which the marks 11 are formed only between the positions corresponding to the upper limit and lower limit of beveling (within a specified range). However, marks 11 may be formed also outside of the specified range. In this case, the amount of beveling can be visually measured even when the amount of beveling is out of the specified range. That is, even when the beveling is finished out of the specified range, it is possible to obtain information about the excess or shortage of amount, so as to further enhance the process control ability.

Also, though the preferred embodiment has shown an example in which the unit cycle pattern 12 includes the marks 11 provided in nine positions between the upper limit and lower limit positions, the application of the invention is not limited to this example. Considering that the conventional display panels had marks only in the three positions including the upper limit, lower limit, and center, providing the marks 11 in four or more positions between the upper limit and lower limit in the invention allows more precise measurement of the amount of beveling than the conventional display panels.

Also, though the preferred embodiment has shown an example in which the unit cycle pattern 12 includes nine interconnections 3, the number of interconnections 3 can be arbitrarily determined. For example, forming a unit cycle pattern 12 with a larger number of interconnections 3 allows formation of a larger number of marks 11 between the upper limit and lower limit of beveling, with individual marks 11 shifted from each other at a smaller distance. In other words, this enhances the resolution of visual measurement of the amount of beveling, which further enhances the precision of the measurement of beveling.

Figure 5:
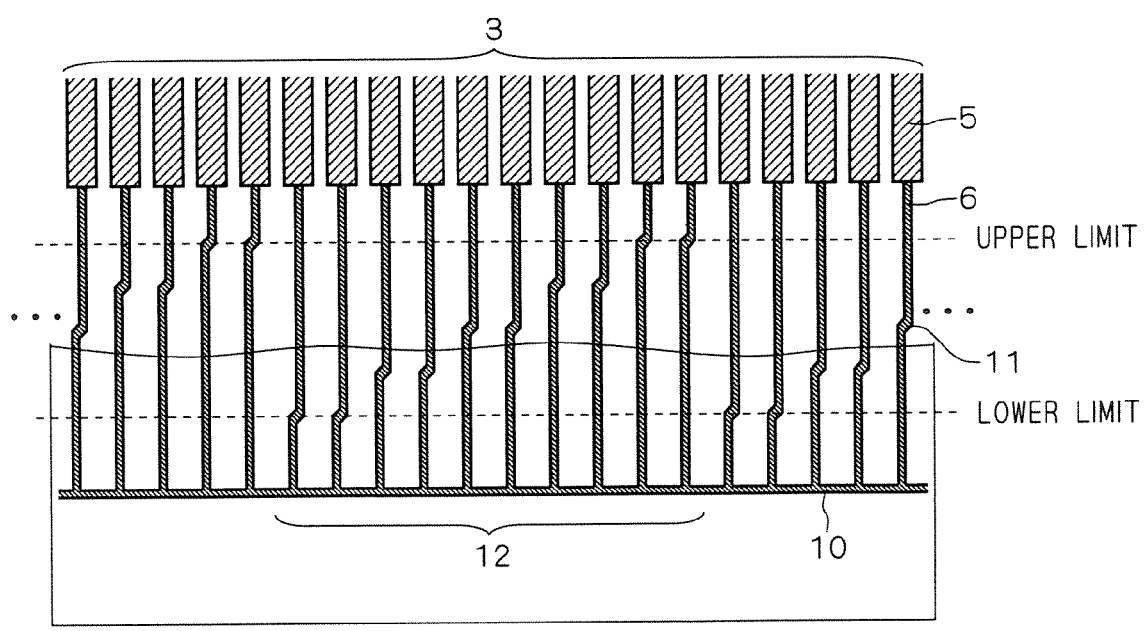
FIG. 5 is a diagram showing a modification of the display panel of the first preferred embodiment.

Furthermore, in the preferred embodiment, the marks 11 of the interconnections 3 are formed in positions shifted one by one at a given distance. However, the same effect is obtained when the marks 11 are positioned such that the marks 11 of a plurality of interconnections 3 are shifted from the marks 11 of another plurality, as long as each plurality includes a constant number of interconnections 3. FIG. 5 shows a specific example of such arrangement, where the marks 11 of every two interconnections 3 are shifted from those of other two interconnections 3. Also, while this preferred embodiment has shown an example in which all interconnections 3 have marks 11 (i.e., an example in which all interconnections 3 are "marked interconnections"), the interconnections 3 may include ones having no marks 11.

In the example of FIG. 2, the bent portions of the interconnections 3 serve as the marks 11. However, the marks 11 may be formed in any shape as long as they are visually recognizable in the beveling process. For example, projections may be formed as parts of the interconnections 3 and used as marks 11 (see FIG. 3), or the width of the interconnections 3 may be varied in parts and the parts of the varied width may be used as the marks 11 (for example, see FIG. 8 of Patent Document 1), or parts of the interconnections 3 may be shaped like slits and edges formed by the slits may be used as the marks 11 (for example, see FIG. 6 of Patent Document 1).

Second Preferred Embodiment

Figure 3:
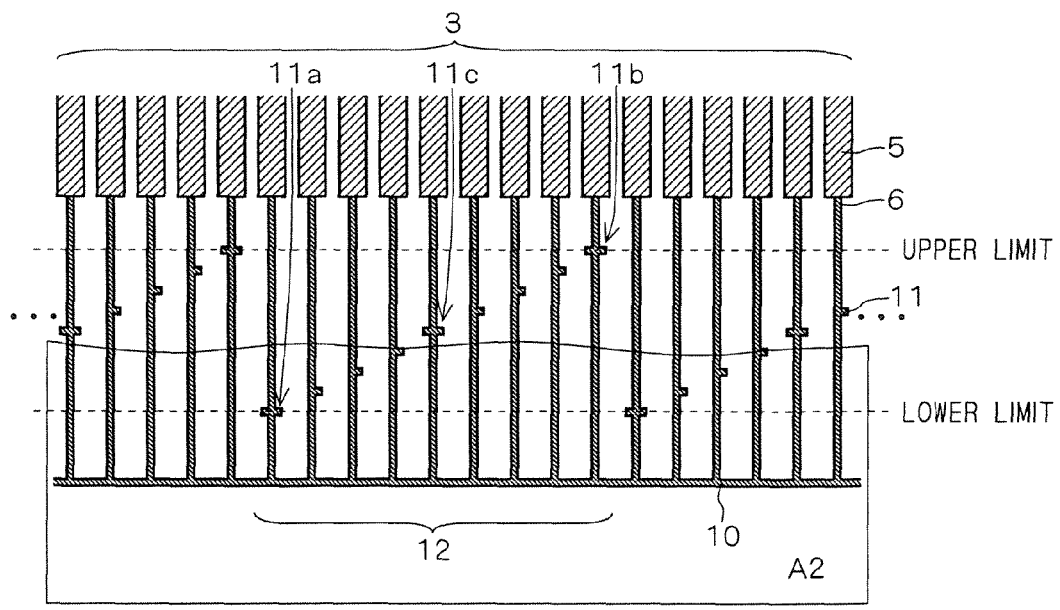
FIG. 3 is an enlarged view of a beveled area and its vicinity near an edge of a display panel of a second preferred embodiment.

FIG. 3 is a diagram used to describe the structure of a display device according to a second preferred embodiment of the present invention. FIG. 3 is an enlarged view showing a beveled area A2 and its vicinity along an edge of the display panel. In FIG. 3, the elements having the same functions as those of FIGS. 1 and 2 are shown at the same reference characters. As shown in FIG. 3, the structure of the display device of this preferred embodiment differs from that of the first preferred embodiment (FIG. 2) in the shape of the marks 11. The structures are the same in other respects.

As shown in FIG. 3, the marks 11 are provided only in the region between the upper limit and lower limit positions of beveling (within a specified range). That is, among the marks 11, the one located in the outermost position on the first substrate 1 (the mark 11a) corresponds to the lower limit position and the innermost one (the mark 11b) corresponds to the upper limit position. In this preferred embodiment, among the marks 11, the mark 11a in the lower limit position, the mark 11b in the upper limit position, and the mark 11c in the central position are shaped differently from others. Specifically, the mark 11a in the lower limit position, the mark 11b in the upper limit position, and the mark 11c in the central position are formed as projections projecting on both sides of the interconnections 3, and the remaining marks 11 are formed as projections projecting on the right.

In the conventional display panel, the lower limit position, the upper limit position, and the central position of beveling are easy to distinguish because the marks are provided only in the three positions, or at the upper limit, lower limit, and center. However, according to the present invention, a larger number of marks 11 are provided, and so it may be difficult to tell which of the plurality of marks 11 correspond to the lower limit, upper limit, and central positions. This problem may be more serious especially when marks 11 are additionally provided outside the upper limit position and the lower limit position so that excess and shortage of the amount of beveling can be visually measured even when the amount of beveling is out of the specified range.

Accordingly, in this preferred embodiment, the lower limit position mark 11a, the upper limit position mark 11b, and the central position mark 11c are formed in a different shape from the remaining marks 11, so that workers who conduct the beveling can easily distinguish the lower limit position, upper limit position, and central position among a large number of marks 11. That is, the target amount of beveling is made clearer, and so the precision and working efficiency of the beveling process are enhanced, which as a result contributes to reduction of manufacturing costs.

In the example of FIG. 3, the three marks 11 including the lower limit position mark 11a, the upper limit position mark 11b, and the central position mark 11c are all shaped differently from the remaining ones. However, only one or two of them may be shaped differently. For example, forming only the lower limit position mark 11a in a different shape at least makes the lower limit position clear, which certainly prevents insufficient removal of the shorting interconnection 10. Also, it is not essential to uniformly shape the marks 11a, 11b, and 11c, but they can be formed in different shapes from each other as long as their shapes are distinguishable from the shape of the remaining marks 11.

Third Preferred Embodiment

Figure 4:
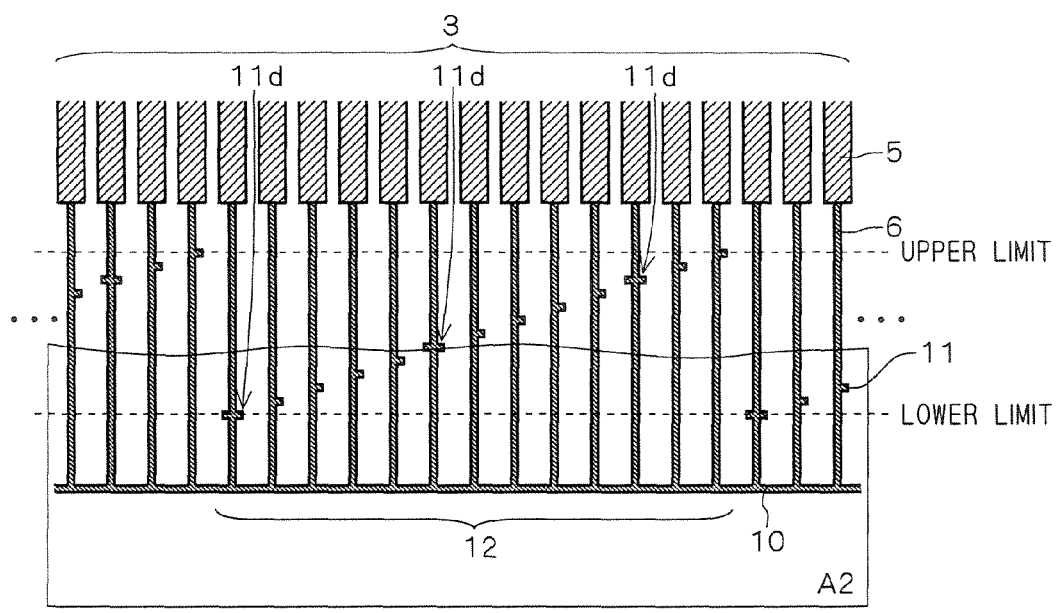
FIG. 4 is an enlarged view of a beveled area and its vicinity near an edge of a display panel of a third preferred embodiment.

FIG. 4 is a diagram used to describe the structure of a display device according to a third preferred embodiment of the present invention. FIG. 4 is an enlarged view showing a beveled area A2 and its vicinity along an edge of the display panel. In FIG. 4, too, the elements having the same functions as those of FIGS. 1 and 2 are shown at the same reference characters. As shown in FIG. 4, the structure of the display device of this preferred embodiment differs from that of the first preferred embodiment (FIG. 2) in the shape of the marks 11. For convenience of description, the unit cycle pattern 12 of FIG. 4 includes an increased number of, 13, interconnections 3.

As shown in FIG. 4, the marks 11 are provided only in the region between the upper limit and lower limit positions of beveling (within a specified range). In this preferred embodiment, in the unit cycle pattern 12, marks 11 (marks 11d) of particular interconnections 3 separated by a given number of interconnections 3 are shaped differently from the remaining ones. Specifically, in the unit cycle pattern 12, the marks 11 (the marks 11d) of the particular interconnections 3 separated by four interconnections 3, counted from the left, are shaped differently from the remaining ones. That is, in the unit cycle pattern 12, the marks 11d of the first, sixth, and eleventh interconnections 3 from the left are formed as projections projecting on both sides of the interconnections 3, and the remaining marks 11 are formed as projections projecting on the right (hereinafter the differently shaped marks 11d are referred to as "counting marks 11d").

The counting marks 11d are thus provided at intervals of a given number of interconnections 3 in the unit cycle pattern 12. Accordingly, when measuring the amount of beveling by visually counting the marks 11, the measurements can be easily obtained on the basis of the counting marks 11d without a need to count them from one. For example, when the interconnections 3 separated by four interconnections 3 from the left in a unit cycle pattern 12 have the counting marks 11d as described in this preferred embodiment, it is quite clear that the second counting mark 11d from the left corresponds to the sixth interconnection 3, and the third counting mark 11d corresponds to the eleventh interconnection 3.

This preferred embodiment is especially effective when a large number of marks 11 are provided in each unit cycle pattern 12. That is, it is easy to count the number of marks 11 even when a larger number of marks 11 are provided in a unit cycle pattern 12 for the purpose of enhancing the precision of visual measurement of the amount of beveling. This prevents incorrect counting of the marks 11 and allows achievement of desired measuring precision, and also enhances working efficiency and contributes to reduction of manufacturing costs.

Though the counting marks 11d in the example of FIG. 4 are all shaped in the same form, they may be shaped differently. For example, when the shapes of the counting marks 11d and their numbers are associated with each other, it is possible to recognize the number of interconnections 3 on the basis of the shapes of the counting marks 11d, which further facilitates the counting of the number of marks 11.

It is not essential to provide the counting marks 11d at intervals of four interconnections 3 as shown in FIG. 4, but they can be arranged at any intervals determined taking into consideration the total number of interconnections 3 in the unit cycle pattern 12 and operability from the process control standpoint.

While the invention has been described in detail, the foregoing description is in all aspects illustrative and not restrictive. It is understood that numerous other modifications and variations can be devised without departing from the scope of the invention.

What is claimed is:

1. A display panel comprising:
   first and second substrates sandwiching a display material; and
   a group of wires including a plurality of mutually parallel wires formed on said first substrate, wherein
   said group of wires including at least three marked wires having predeterminedly shaped marks formed in a conductive portion of said wires in a vicinity of an edge of said first substrate in a region of an upper limit position of beveling and a lower limit position of beveling, each of said wires including a terminal for an external connection in the vicinity of said edge of said first substrate, and said marks are arranged outside of said terminal, and
   said marks of adjacent ones of said marked wires being located in positions shifted from each other along a length of said wires so that marks of adjacent wires are not adjacent to one another.

2. The display panel according to claim 1, wherein, in said group of wires, said marks are located in positions shifted along the length of said wires regularly by a given amount between every adjacent ones or between every adjacent constant pluralities of said marked wires.

3. The display panel according to claim 2, wherein, in said group of wires, said marks are arranged in a periodic pattern in a direction along which said wires form a row.

4. The display panel according to claim 2, wherein, in said group of wires, any of said marks located in an innermost position on said first substrate, in its outermost position, and in a central position therebetween is shaped differently from other said marks.

5. The display panel according to claim 3, wherein, in each cycle of said periodic pattern, said marks of particular ones of said marked wires separated by a given number of said wires are shaped differently from other said marks.

6. The display panel according to claim 1, wherein, in said group of wires, said marks are provided in four or more different positions along the length of said wires.

7. A display device having a display panel, said display panel comprising: first and second substrates sandwiching a display material; and
   a group of wires including a plurality of mutually parallel wires formed on said first substrate, wherein,
   said group of wires including at least three marked wires having predeterminedly shaped marks formed in a conductive portion of said wires in a vicinity of an edge of said first substrate in a region of an upper limit position of beveling and a lower limit position of beveling, each of said wires including a terminal for an external connection in the vicinity of said edge of said first substrate, and said marks are arranged outside of said terminal,
   said marks of adjacent ones of said marked wires being located in positions shifted from each other along a length of said wires so that marks of adjacent wires are not adjacent to one another, and
   in said display panel, said edge of said first substrate being beveled.

8. The display device according to claim 7, wherein, in said group of wires, said marks are located in positions shifted along the length of said wires regularly by a given amount between every adjacent ones or between every adjacent constant pluralities of said marked wires.

9. The display device according to claim 8, wherein, in said group of wires, said marks are arranged in a periodic pattern in a direction along which said wires form a row.

10. The display device according to claim 8, wherein, in said group of wires, any of said marks located in an innermost position on said first substrate, in its outermost position, and in a central position therebetween is shaped differently from other said marks.

11. The display device according to claim 9, wherein, in each cycle of said periodic pattern, said marks of particular ones of said marked wires separated by a given number of said wires are shaped differently from other said marks.

12. The display device according to claim 7, wherein, in said group of wires, said marks are provided in four or more different positions along the length of said wires.

* * * * *